(12) United States Patent
Thompson et al.

(10) Patent No.: US 11,912,279 B2
(45) Date of Patent: Feb. 27, 2024

(54) METHODS AND SYSTEM FOR VEHICLE FUNCTION LIMITING

(71) Applicant: Ford Global Technologies, LLC, Dearborn, MI (US)

(72) Inventors: Scott Thompson, Belleville, MI (US); David Hancock, Flat Rock, MI (US); Scott Christensen, Canton, MI (US); John Rollinger, Troy, MI (US); Jeremy Russell, Livonia, MI (US); Jeffrey Tumavitch, Livonia, MI (US); Dennis Light, Monroe, MI (US); David Schmitt, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 87 days.

(21) Appl. No.: 17/447,130

(22) Filed: Sep. 8, 2021

(65) Prior Publication Data

US 2023/0070435 A1 Mar. 9, 2023

(51) Int. Cl.
| | |
|---|---|
| *B60W 50/035* | (2012.01) |
| *B60W 30/18* | (2012.01) |
| *B60W 10/04* | (2006.01) |
| *B60W 10/20* | (2006.01) |
| *B60W 40/09* | (2012.01) |
| *H04L 12/40* | (2006.01) |
| *B60W 40/08* | (2012.01) |

(52) U.S. Cl.
CPC ...... *B60W 30/18009* (2013.01); *B60W 10/04* (2013.01); *B60W 10/20* (2013.01); *B60W 40/09* (2013.01); *H04L 12/40084* (2013.01); *H04L 12/40104* (2013.01); *B60W 2040/0809* (2013.01); *H04L 2012/40215* (2013.01); *H04L 2012/40273* (2013.01)

(58) Field of Classification Search
CPC .. B60W 50/00; B60W 50/038; B60W 50/035; B60W 60/00; B60W 60/0018; B60W 60/00188
See application file for complete search history.

(56) References Cited

U.S. PATENT DOCUMENTS

| | | | | |
|---|---|---|---|---|
| 9,725,089 | B2 * | 8/2017 | Tashiro | B60T 7/22 |
| 11,040,619 | B1 * | 6/2021 | Martin | B60W 40/08 |
| 11,511,761 | B2 * | 11/2022 | Ochida | B60W 50/035 |
| 2011/0130904 | A1 | 6/2011 | McGrogan et al. | |
| 2012/0158225 | A1 * | 6/2012 | Books | B60W 10/06 701/99 |
| 2013/0274967 | A1 * | 10/2013 | Tan | B60W 20/11 903/915 |

(Continued)

FOREIGN PATENT DOCUMENTS

CN 112441005 A * 3/2021 ............ B60W 20/13

*Primary Examiner* — Tisha D Lewis
(74) *Attorney, Agent, or Firm* — Vincent Mastrogiacomo; McCoy Russell LLP

(57) ABSTRACT

Systems and methods for limiting functionality of a vehicle are described. In one example, vehicle feature modules may specify vehicle behaviors and vehicle operation is limited according to the specified behaviors. Vehicle actuators may be adjusted to limit vehicle operation according to the specified vehicle behaviors. The vehicle behaviors may apply to powertrain systems, navigation systems, climate control systems, lighting systems and other vehicle systems.

20 Claims, 8 Drawing Sheets

(56) References Cited

U.S. PATENT DOCUMENTS

| | | |
|---|---|---|
| 2015/0081148 A1 | 3/2015 | Heap et al. |
| 2020/0023860 A1* | 1/2020 | Lee .................... B60W 50/045 |
| 2021/0070315 A1* | 3/2021 | Thompson ............. G05D 1/021 |
| 2021/0291862 A1* | 9/2021 | Jiang ................... B60W 60/001 |

* cited by examiner

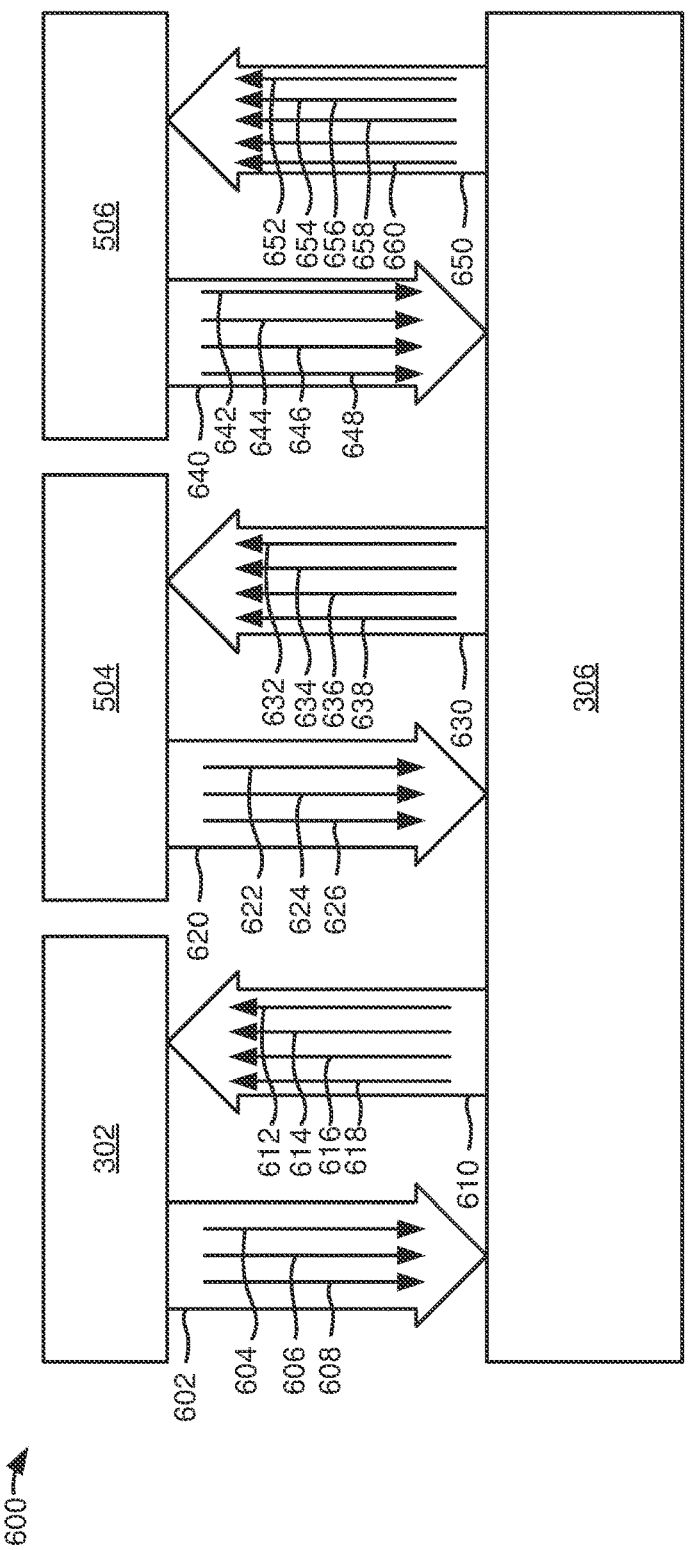

Feature request group A — 700

| State | Inhibit type | Description |
|---|---|---|
| 1 | No limit request | No limit request |
| 2 | Custom 1 | |
| 3 | Custom 2 | |
| 4 | Power pack/crank inhibit | Shutdown engine |
| 5 | Secure mode | Prevent vehicle movement |
| 6 | Non-motive mode | Prevent transmitting of motive power |
| 7 | Limited propulsion | Limit vehicle to creep torque |
| 8 | VSL low | Limit vehicle to xx speed |
| 9 | VSL medium | Limit vehicle to xx speed |
| 10 | VSL high | Limit vehicle to xx speed |
| 11 | VSL custom | Limit vehicle to xx speed |
| 12 | TQL high | Truncate torque |
| 13 | TQL medium | Reduce vehicle power |
| 14 | EV only | Use EV power source |
| 15 | Save EV | Use IC engine |
| 16 | Forward propulsion only | Restrict transmission to P/N/D |
| 17 | Reverse propulsion only | Restrict transmission to P/N/R |
| 18 | reserve | Reserved |
| 19 | reserve | Reserved |
| 20 | reserve | Reserved |
| 21 | reserve | Reserved |
| 22 | reserve | Reserved |
| 23 | reserve | Reserved |
| 24 | reserve | Reserved |
| 25 | reserve | Reserved |
| 26 | reserve | Reserved |
| 27 | reserve | Reserved |
| 28 | reserve | Reserved |
| 29 | reserve | Reserved |

702 ▸ 704 ▸ 706 ▸

Feature request group B — 720

| State | Inhibit type | Description |
|---|---|---|
| 1 | No limit request | No limit request |
| 2 | Custom 1 | |
| 3 | Custom 2 | |
| 4 | Power pack/crank inhibit | Shutdown engine |
| 5 | Secure mode | Prevent vehicle movement |
| 6 | Non-motive mode | Prevent transmitting of motive power |
| 7 | Limited propulsion | Limit vehicle to creep torque |
| 8 | VSL low | Limit vehicle to xx speed |
| 9 | VSL medium | Limit vehicle to xx speed |
| 10 | VSL high | Limit vehicle to xx speed |
| 11 | VSL custom | Limit vehicle to xx speed |
| 12 | TQL high | Truncate torque |
| 13 | TQL medium | Reduce vehicle power |
| 14 | EV only | Use EV power source |
| 15 | Save EV | Use IC engine |
| 16 | Forward propulsion only | Restrict transmission to P/N/D |
| 17 | Reverse propulsion only | Restrict transmission to P/N/R |
| 18 | reserve | Reserved |
| 19 | reserve | Reserved |
| 20 | reserve | Reserved |
| 21 | reserve | Reserved |
| 22 | reserve | Reserved |
| 23 | reserve | Reserved |
| 24 | reserve | Reserved |
| 25 | reserve | Reserved |
| 26 | reserve | Reserved |
| 27 | reserve | Reserved |
| 28 | reserve | Reserved |
| 29 | reserve | Reserved |

Table 800 — VFL feature response group A

| State | Inhibit type | Description |
|---|---|---|
| 1 | No limit request | No limit request |
| 2 | Custom 1 | |
| 3 | Custom 2 | |
| 4 | Power pack/crank inhibit | Shutdown engine |
| 5 | Secure mode | Prevent vehicle movement |
| 6 | Non-motive mode | Prevent transmitting of motive power |
| 7 | Limited propulsion | Limit vehicle to creep torque |
| 8 | VSL low | Limit vehicle to xx speed |
| 9 | VSL medium | Limit vehicle to xx speed |
| 10 | VSL high | Limit vehicle to xx speed |
| 11 | VSL custom | Limit vehicle to xx speed |
| 12 | TQL high | Truncate torque |
| 13 | TQL medium | Reduce vehicle power |
| 14 | EV only | Use EV power source |
| 15 | Save EV | Use IC engine |
| 16 | Forward propulsion only | Restrict transmission to P/N/D |
| 17 | Reverse propulsion only | Restrict transmission to P/N/R |
| 18 | reserve | Reserved |
| 19 | reserve | Reserved |
| 20 | reserve | Reserved |
| 21 | reserve | Reserved |
| 22 | reserve | Reserved |
| 23 | reserve | Reserved |
| 24 | reserve | Reserved |
| 25 | reserve | Reserved |
| 26 | reserve | Reserved |
| 27 | reserve | Reserved |
| 28 | reserve | Reserved |
| 29 | reserve | Reserved |

Table 820 — VFL feature response group B

| State | Inhibit type | Description |
|---|---|---|
| 1 | No limit request | No limit request |
| 2 | Custom 1 | |
| 3 | Custom 2 | |
| 4 | Power pack/crank inhibit | Shutdown engine |
| 5 | Secure mode | Prevent vehicle movement |
| 6 | Non-motive mode | Prevent transmitting of motive power |
| 7 | Limited propulsion | Limit vehicle to creep torque |
| 8 | VSL low | Limit vehicle to xx speed |
| 9 | VSL medium | Limit vehicle to xx speed |
| 10 | VSL high | Limit vehicle to xx speed |
| 11 | VSL custom | Limit vehicle to xx speed |
| 12 | TQL high | Truncate torque |
| 13 | TQL medium | Reduce vehicle power |
| 14 | EV only | Use EV power source |
| 15 | Save EV | Use IC engine |
| 16 | Forward propulsion only | Restrict transmission to P/N/D |
| 17 | Reverse propulsion only | Restrict transmission to P/N/R |
| 18 | reserve | Reserved |
| 19 | reserve | Reserved |
| 20 | reserve | Reserved |
| 21 | reserve | Reserved |
| 22 | reserve | Reserved |
| 23 | reserve | Reserved |
| 24 | reserve | Reserved |
| 25 | reserve | Reserved |
| 26 | reserve | Reserved |
| 27 | reserve | Reserved |
| 28 | reserve | Reserved |
| 29 | reserve | Reserved |

METHODS AND SYSTEM FOR VEHICLE FUNCTION LIMITING

FIELD

The present description relates to methods and a system for controlling operation of a vehicle.

BACKGROUND AND SUMMARY

A vehicle may include a plurality of features. The features may include hardware and/or software to carry out functions that a vehicle may perform. For example, the vehicle may include a feature for stolen vehicle services. The stolen vehicle services feature may make requests to control a way a vehicle operates or behaves if it is determined that the vehicle has been stolen, or has attempted to operate without authorization. The stolen vehicle services feature may determine how the vehicle's propulsion source and transmission are to be operated if the vehicle is determined to be stolen. In one example, if the stolen vehicle services feature determines that the vehicle is stolen, the vehicle's internal combustion engine may be temporarily deactivated by preventing fuel flow to the engine by way of preventing fuel injector (e.g., actuators) operation. In addition, the stolen vehicle services feature may determine what, if any, of the vehicle's infotainment system attributes are operational if the vehicle is determined to be stolen. In one example, if the stolen vehicle services feature determines that the vehicle is stolen, the vehicle's audio system, navigation system, and visual displays may be temporarily deactivated by preventing electrical power flow to the systems via relays or switches (e.g., actuators). The vehicle may also include a fleet vehicle services feature for fleet owners. The fleet vehicle services feature may prevent the vehicle's internal combustion engine from operating during some conditions by preventing fuel flow to the engine. For example, the fleet vehicle services feature may prevent the engine from running and may only allow an electrically driven propulsion source of the vehicle to operate if the vehicle is driven into an enclosed area, such as a factory. Further, the fleet vehicle services feature may selectively activate and deactivate the vehicle's navigation, audio, and visual systems according to subscription service purchases.

Thus, the various features of the vehicle may interface with actuators of the vehicle's various systems to control vehicle operation in a way that is prescribed by the various features. However, under this control structure, the designers of a particular feature may have to interface with designers of other features and the designers of actuator controls for each actuator that may be affected by a feature that is being updated or enhanced. The designers of other features may also have to modify their feature design to be compatible with the feature that is being updated or enhanced to ensure that the actuators respond as may be expected. Thus, it may be time consuming and costly to update or enhance features when features are configured to directly operate and control actuators.

The inventors herein have recognized the above-mentioned issues and have developed a method for limiting operation of a vehicle, comprising: receiving a plurality of requests from a plurality of vehicle features to a vehicle function limiting service, where the plurality of requests are based on a single group of predefined vehicle behaviors; and adjusting one or more actuators according to output of the vehicle function limiting service.

By adjusting one or more actuators in response to a plurality of requests to limit vehicle operation that are based on a single group of predefined vehicle behaviors, it may be possible to provide the technical result of simplifying how vehicle limiting requests may be facilitated. In particular, a vehicle function limiting service may respond to a predetermined group of predefined vehicle behaviors that may be requested by a plurality of vehicle features. Thus, each vehicle feature does not generate a unique vehicle limiting request. Rather, each vehicle feature may request a vehicle behavior from a predetermined group of vehicle behaviors, and different vehicle features may request a same vehicle behavior. The vehicle function limiting service may then arbitrate and prioritize the requested vehicle behaviors so that a desirable vehicle response may be generated.

The present description may provide several advantages. In particular, the approach may simplify how vehicle features may request vehicle limiting (e.g., restricting vehicle operation between the vehicle's maximum capacity to perform an operation or function and the vehicle's minimum capacity to perform the operation or function). Further, the approach may simplify vehicle design and manufacture. In addition, the approach may simplify diagnosing vehicle systems.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where:

FIG. 6 shows a block diagram of CAN message exchanges between vehicle features and a vehicle function limiting service;

FIG. 7 shows two groups of example vehicle behavior requests;

FIG. 8 shows two groups of example vehicle responses to vehicle behavior request.

DETAILED DESCRIPTION

Figure 1:
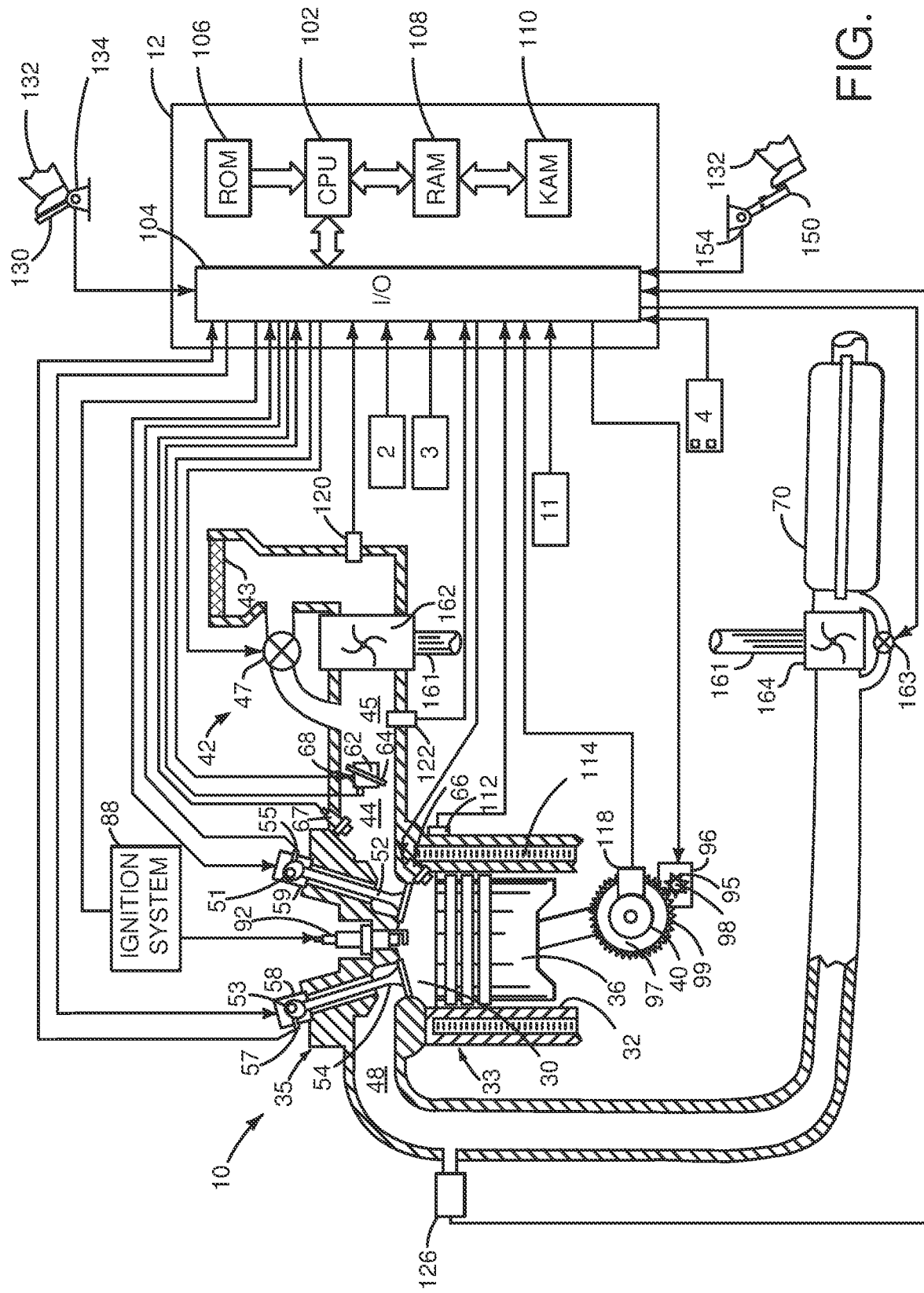
FIG. 1 is a schematic diagram of an engine.
Figure 2:
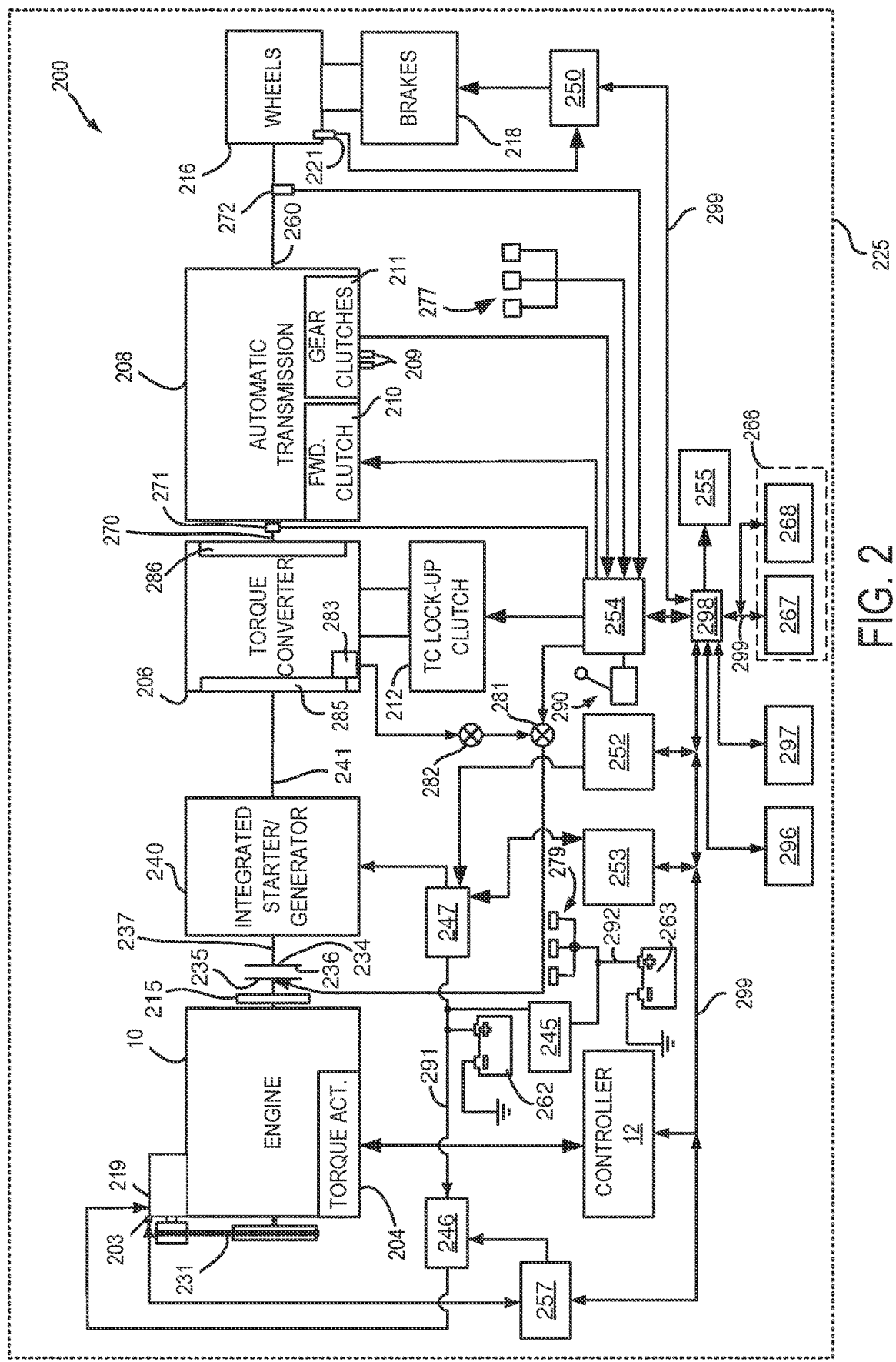
FIG. 2 is a schematic diagram of a vehicle driveline or powertrain.
Figure 3:
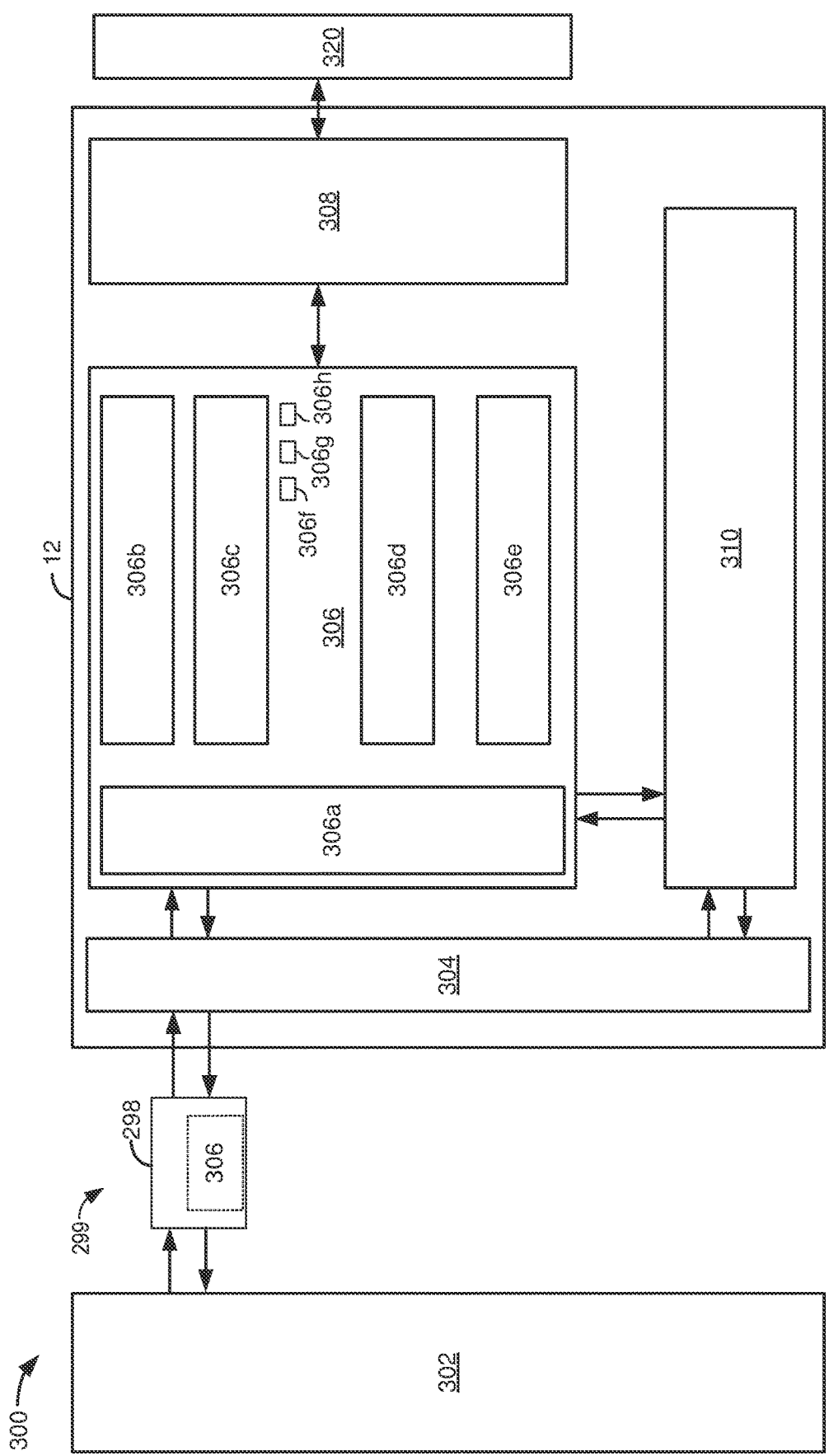
FIG. 3 shows a block diagram of an example vehicle limiting system that includes a vehicle function limiting service.
Figure 9:
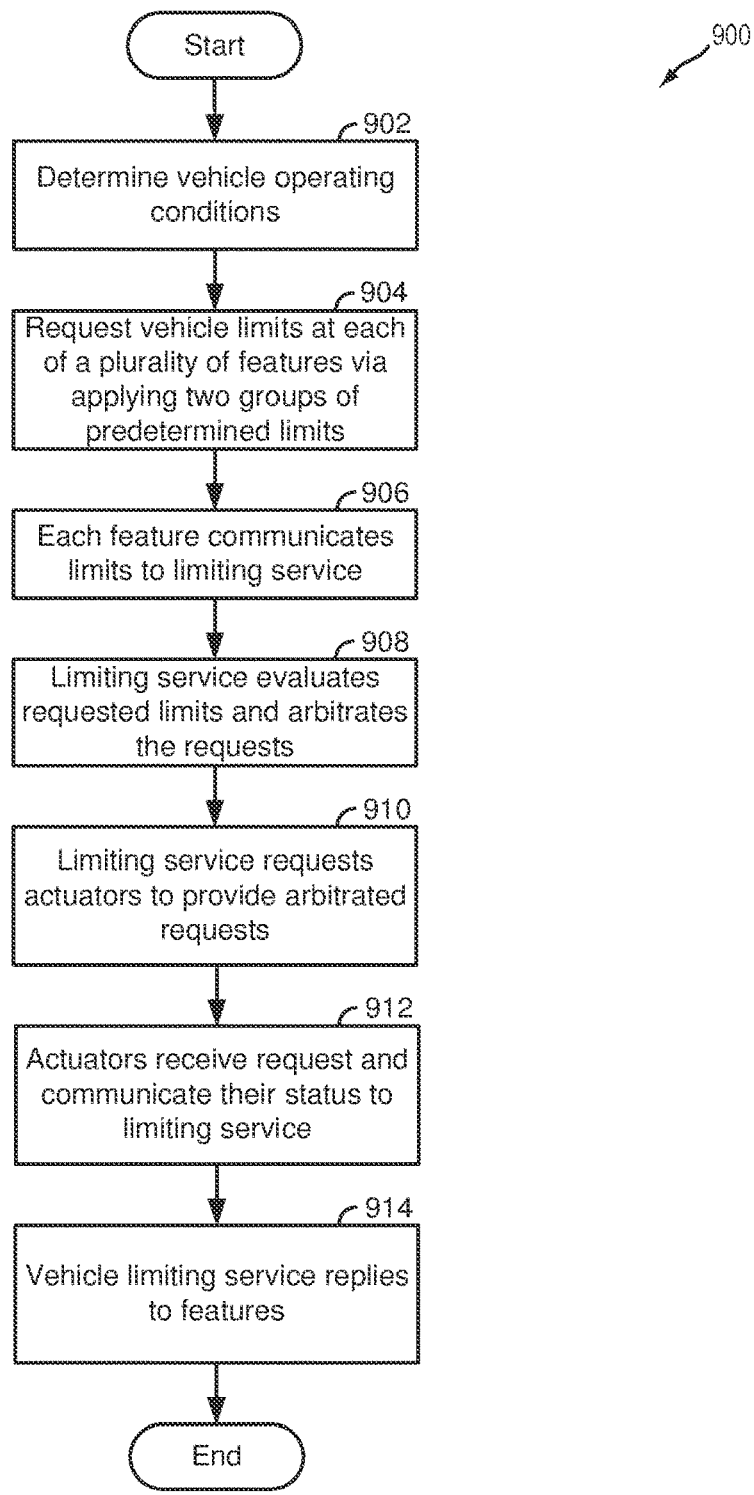
FIG. 9 shows a flow chart of an example method for limiting vehicle operation.

The present description is related to limiting operation of vehicle systems and components. The vehicle limiting may be requested via one or more vehicle features (e.g., hardware and/or software that may provide functionality and/or data to or via vehicle systems and components). For example, a stolen vehicle service feature may request that an engine or other propulsion source not reactivate once a vehicle is parked until the vehicle is determined to be not stolen. The limiting methods and systems described herein may be included with a vehicle that includes an internal combustion engine as shown in FIG. 1. The internal combustion engine may be complemented with an electric machine in a hybrid vehicle as shown in FIG. 2. Alternatively, the vehicle may be an electric vehicle that does not include an internal combustion engine. The vehicle may include a vehicle function limiting service as shown in FIG. 3. Vehicle features may interface with vehicle actuators according to the configurations of FIGS. 4 and 5. Controller area network (CAN) signals may be exchanged between vehicle features and the vehicle function limiting service as shown in FIG. 6. Example requested vehicle behaviors and responses are shown in FIGS. 7 and 8. A flowchart of an example method for limiting vehicle operation is shown in FIG. 9.

Referring to FIG. 1, internal combustion engine 10, comprising a plurality of cylinders, one cylinder of which is shown in FIG. 1, is controlled by electronic engine controller 12. The controller 12 receives signals from the various sensors shown in FIGS. 1 and 2. The controller employs the actuators shown in FIGS. 1 and 2 to adjust engine and driveline or powertrain operation based on the received signals and instructions stored in memory of controller 12.

Engine 10 is comprised of cylinder head 35 and block 33, which include combustion chamber 30 and cylinder walls 32. Piston 36 is positioned therein and reciprocates via a connection to crankshaft 40. Flywheel 97 and ring gear 99 are coupled to crankshaft 40. Optional starter 96 (e.g., low voltage (operated with less than 30 volts) electric machine) includes pinion shaft 98 and pinion gear 95. Pinion shaft 98 may selectively advance pinion gear 95 to engage ring gear 99. Optional starter 96 may be directly mounted to the front of the engine or the rear of the engine. In some examples, starter 96 may selectively supply power to crankshaft 40 via a belt or chain. In addition, starter 96 is in a base state when not engaged to the engine crankshaft 40 and flywheel ring gear 99. Starter 96 may be referred to as a flywheel starter.

Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57. Intake valve 52 may be selectively activated and deactivated by valve activation device 59. Exhaust valve 54 may be selectively activated and deactivated by valve activation device 58. Valve activation devices 58 and 59 may be electromechanical devices.

Direct fuel injector 66 is shown positioned to inject fuel directly into cylinder 30, which is known to those skilled in the art as direct injection. Port fuel injector 67 is shown positioned to inject fuel into the intake port of cylinder 30, which is known to those skilled in the art as port injection. Fuel injectors 66 and 67 deliver liquid fuel in proportion to pulse widths provided by controller 12. Fuel is delivered to fuel injectors 66 and 67 by a fuel system (not shown) including a fuel tank, fuel pump, and fuel rail (not shown).

In addition, intake manifold 44 is shown communicating with turbocharger compressor 162 and engine air intake 42. In other examples, compressor 162 may be a supercharger compressor. Shaft 161 mechanically couples turbocharger turbine 164 to turbocharger compressor 162. Optional electronic throttle 62 adjusts a position of throttle plate 64 to control air flow from compressor 162 to intake manifold 44. Pressure in boost chamber 45 may be referred to a throttle inlet pressure since the inlet of throttle 62 is within boost chamber 45. The throttle outlet is in intake manifold 44. In some examples, throttle 62 and throttle plate 64 may be positioned between intake valve 52 and intake manifold 44 such that throttle 62 is a port throttle. Compressor recirculation valve 47 may be selectively adjusted to a plurality of positions between fully open and fully closed. Waste gate 163 may be adjusted via controller 12 to allow exhaust gases to selectively bypass turbine 164 to control the speed of compressor 162. Air filter 43 cleans air entering engine air intake 42.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of three-way catalyst 70. Alternatively, a two-state exhaust gas oxygen sensor may be substituted for UEGO sensor 126.

Catalyst 70 may include multiple bricks and a three-way catalyst coating, in one example. In another example, multiple emission control devices, each with multiple bricks, can be used.

Controller 12 is shown in FIG. 1 as a conventional microcomputer including: microprocessor unit 102, input/output ports 104, read-only memory 106 (e.g., non-transitory memory), random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to a driver demand pedal 130 (e.g., a human/machine interface) for sensing force applied by human driver 132; a position sensor 154 coupled to brake pedal 150 (e.g., a human/machine interface) for sensing force applied by human driver 132, a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; and a measurement of throttle position from sensor 68. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

Controller 12 may also receive input from human/machine interface 11. A request to start or stop the engine or vehicle may be generated via a human and input to the human/machine interface 11. The human/machine interface 11 may be a touch screen display, pushbutton, key switch or other known device. Controller 12 may also receive navigation and GPS data (e.g., locations of lights, signs, roads, etc.) from GPS receiver/navigation system 2. Controller 12 may interface with other vehicles to receive traffic data (e.g., locations of other vehicles, traffic flow, etc.) from connected vehicle interface 3. Controller 12 may receive proximity data from other vehicles via vehicle proximity sensing system 4. A user may select and/or request a vehicle drive mode (e.g., economy, track, highway, hill descent, etc.) via the human machine interface 11.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC).

During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion.

During the expansion stroke, the expanding gases push piston 36 back to BDC. Crankshaft 40 converts piston movement into a rotational power of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

FIG. 2 is a block diagram of a vehicle 225 including a powertrain or driveline 200. The powertrain of FIG. 2 includes engine 10 shown in FIG. 1. Powertrain 200 is shown including vehicle system controller 255, engine controller 12, first electric machine controller 252, second electric machine controller 257, transmission controller 254, energy storage device controller 253, and brake controller 250. In addition, vehicle 225 may include a climate control system controller 296, a vehicle lighting controller 297, infotainment system controller 266, audio system controller 267, and a display controller 268. All of the controllers described herein may be connected and communicate to other controllers via CAN 229. The CAN 229 may include an enhanced gateway 298 for connecting several CAN buses that may operate at different communication speeds. Each of the controllers may provide information to other controllers and request predefined vehicle behaviors as described herein to limit vehicle operation. Further, the vehicle system controller 255 may provide commands to engine controller 12, electric machine controller 252, transmission controller 254, and brake controller 250 to achieve driver input requests and other requests that are based on vehicle operating conditions.

For example, in response to a driver releasing a driver demand pedal and vehicle speed, vehicle system controller 255 may request a desired wheel power or a wheel power level to provide a desired rate of vehicle speed reduction. The requested desired wheel power may be provided by vehicle system controller 255 requesting a first braking power from electric machine controller 252 and a second braking power from engine controller 12, the first and second powers providing a desired driveline braking power at vehicle wheels 216. Vehicle system controller 255 may also request a friction braking power via brake controller 250. The braking powers may be referred to as negative powers since they slow driveline and wheel rotation. Positive power may maintain or increase speed of the driveline and wheel rotation.

In another example, CAN 299 may transfer messages between controllers described herein. The controllers may operate and control electric power flow to the various actuators and systems (e.g., navigation, lighting, infotainment system, etc.) via power control switches, relays, DC/DC converters, and inverters.

In other examples, the partitioning of controlling powertrain devices may be partitioned differently than is shown in FIG. 2. For example, a single controller may take the place of vehicle system controller 255, engine controller 12, first electric machine controller 252, second electric machine controller 257, transmission controller 254, and brake controller 250. Alternatively, the vehicle system controller 255 and the engine controller 12 may be a single unit while the electric machine controller 252, the transmission controller 254, and the brake controller 250 are standalone controllers.

In this example, powertrain 200 may be powered by engine 10 and electric machine 240. In other examples, engine 10 may be omitted. Engine 10 may be started with an engine starting system shown in FIG. 1, via belt integrated starter/generator (BISG) 219, or via driveline integrated starter/generator (ISG) 240 also known as an integrated starter/generator. A temperature of BISG 219 may be determined via optional BISG temperature sensor 203. Driveline ISG 240 (e.g., high voltage (operated with greater than 30 volts) electrical machine) may also be referred to as an electric machine, motor, and/or generator. Further, power of engine 10 may be adjusted via power actuator 204, such as a fuel injector, throttle, etc.

Driveline 200 is shown to include a belt integrated starter/generator (BISG) 219. BISG 219 may be coupled to crankshaft 40 of engine 10 via a belt 231. Alternatively, BISG 219 may be directly coupled to crankshaft 40. BISG 219 may provide a negative torque to driveline 200 when charging higher voltage electric energy storage device 262 (e.g., a traction battery). BISG 219 may also provide a positive torque to rotate driveline 200 via energy supplied by lower voltage electric energy storage device (e.g., a battery or capacitor) 263. In one example, electric energy storage device 262 may output a higher voltage (e.g., 48 volts) than electric energy storage device 263 (e.g., 12 volts). DC/DC converter 245 may allow exchange of electrical energy between high voltage bus 291 and low voltage bus 292. High voltage bus 291 is electrically coupled to inverter 246 and higher voltage electric energy storage device 262. Low voltage bus 292 is electrically coupled to lower voltage electric energy storage device 263 and sensors/actuators/accessories 279. Electrical accessories 279 may include but are not limited to front and rear windshield resistive heaters, vacuum pumps, climate control fans, and lights. Inverter 246 converts DC power to AC power and vice-versa to enable power to be transferred between ISG 219 and electric energy storage device 262. Likewise, inverter 247 converts DC power to AC power and vice-versa to enable power to be transferred between ISG 240 and electric energy storage device 262.

An engine output power may be transmitted to an input or first side of driveline disconnect clutch 235 through dual mass flywheel 215. Driveline disconnect clutch 236 may be hydraulically actuated via fluid (e.g., oil) that is pressurized via pump 283. A position of valve 282 (e.g., line pressure control valve) may be modulated to control a pressure (e.g., a line pressure) of fluid that may be supplied to driveline disconnect clutch pressure control valve 281. A position of valve 281 may be modulated to control a pressure of fluid that is supplied to driveline disconnect clutch 235. The downstream or second side 234 of disconnect clutch 236 is shown mechanically coupled to ISG input shaft 237.

ISG 240 may be operated to provide power to powertrain 200 or to convert powertrain power into electrical energy to be stored in electric energy storage device 262 in a regeneration mode. ISG 240 is in electrical communication with energy storage device 262. ISG 240 has a higher output power capacity than starter 96 shown in FIG. 1 or BISG 219. Further, ISG 240 directly drives powertrain 200 or is directly driven by powertrain 200. There are no belts, gears, or chains to couple ISG 240 to powertrain 200. Rather, ISG 240 rotates at the same rate as powertrain 200. Electrical energy storage device 262 (e.g., high voltage battery or power source) may be a battery, capacitor, or inductor. The downstream side of ISG 240 is mechanically coupled to the impeller 285 of torque converter 206 via shaft 241. The upstream side of the ISG 240 is mechanically coupled to the disconnect clutch 236. ISG 240 may provide a positive power or a negative power to powertrain 200 via operating as a motor or generator as instructed by electric machine controller 252.

Torque converter 206 includes a turbine 286 to output power to input shaft 270. Input shaft 270 mechanically couples torque converter 206 to automatic transmission 208. Torque converter 206 also includes a torque converter bypass lock-up clutch 212 (TCC). Power is directly transferred from impeller 285 to turbine 286 when TCC is locked. TCC is electrically operated by controller 254. Alternatively, TCC may be hydraulically locked. In one example, the torque converter may be referred to as a component of the transmission.

When torque converter lock-up clutch 212 is fully disengaged, torque converter 206 transmits engine power to automatic transmission 208 via fluid transfer between the torque converter turbine 286 and torque converter impeller 285, thereby enabling torque multiplication. In contrast, when torque converter lock-up clutch 212 is fully engaged, the engine output power is directly transferred via the torque converter clutch to an input shaft 270 of transmission 208. Alternatively, the torque converter lock-up clutch 212 may be partially engaged, thereby enabling the amount of power directly transferred to the transmission to be adjusted. The transmission controller 254 may be configured to adjust the amount of power transmitted by torque converter 212 by adjusting the torque converter lock-up clutch in response to various engine operating conditions, or based on a driver-based engine operation request.

Torque converter 206 also includes pump 283 that pressurizes fluid to operate disconnect clutch 236, forward clutch 210, and gear clutches 211. Pump 283 is driven via impeller 285, which rotates at a same speed as ISG 240.

Automatic transmission 208 includes gear clutches (e.g., gears 1-10) 211 and forward clutch 210. Automatic transmission 208 is a fixed ratio transmission. Alternatively, transmission 208 may be a continuously variable transmission that has a capability of simulating a fixed gear ratio transmission and fixed gear ratios. The gear clutches 211 and the forward clutch 210 may be selectively engaged to change a ratio of an actual total number of turns of input shaft 270 to an actual total number of turns of wheels 216. Gear clutches 211 may be engaged or disengaged via adjusting fluid supplied to the clutches via shift control solenoid valves 209. Power output from the automatic transmission 208 may also be relayed to wheels 216 to propel the vehicle via output shaft 260. Specifically, automatic transmission 208 may transfer an input driving power at the input shaft 270 responsive to a vehicle traveling condition before transmitting an output driving power to the wheels 216. Transmission controller 254 selectively activates or engages TCC 212, gear clutches 211, and forward clutch 210. Transmission controller also selectively deactivates or disengages TCC 212, gear clutches 211, and forward clutch 210.

A frictional force may be applied to wheels 216 by engaging friction wheel brakes 218. In one example, friction wheel brakes 218 may be engaged in response to a human driver pressing their foot on a brake pedal (not shown) and/or in response to instructions within brake controller 250. Further, brake controller 250 may apply brakes 218 in response to information and/or requests made by vehicle system controller 255. In the same way, a frictional force may be reduced to wheels 216 by disengaging wheel brakes 218 in response to the human driver releasing their foot from a brake pedal, brake controller instructions, and/or vehicle system controller instructions and/or information. For example, vehicle brakes may apply a frictional force to wheels 216 via controller 250 as part of an automated engine stopping procedure. A braking torque may be determined as a function of brake pedal position.

In response to a request to increase a speed of vehicle 225, vehicle system controller may obtain a driver demand power or power request from a driver demand pedal or other device. Vehicle system controller 255 then allocates a fraction of the requested driver demand power to the engine and the remaining fraction to the ISG or BISG. Vehicle system controller 255 requests the engine power from engine controller 12 and the ISG power from electric machine controller 252. If the ISG power plus the engine power is less than a transmission input power limit (e.g., a threshold value not to be exceeded), the power is delivered to torque converter 206 which then relays at least a fraction of the requested power to transmission input shaft 270. Transmission controller 254 selectively locks torque converter clutch 212 and engages gears via gear clutches 211 in response to shift schedules and TCC lockup schedules that may be based on input shaft power and vehicle speed. In some conditions when it may be desired to charge electric energy storage device 262, a charging power (e.g., a negative ISG power) may be requested while a non-zero driver demand power is present. Vehicle system controller 255 may request increased engine power to overcome the charging power to meet the driver demand power.

In response to a request to reduce a speed of vehicle 225 and provide regenerative braking, vehicle system controller may provide a negative desired wheel power (e.g., desired or requested powertrain wheel power) based on vehicle speed and brake pedal position. Vehicle system controller 255 then allocates a fraction of the negative desired wheel power to the ISG 240 and the engine 10. Vehicle system controller may also allocate a portion of the requested braking power to friction brakes 218 (e.g., desired friction brake wheel power). Further, vehicle system controller may notify transmission controller 254 that the vehicle is in regenerative braking mode so that transmission controller 254 shifts gears 211 based on a unique shifting schedule to increase regeneration efficiency. Engine 10 and ISG 240 may supply a negative power to transmission input shaft 270, but negative power provided by ISG 240 and engine 10 may be limited by transmission controller 254 which outputs a transmission input shaft negative power limit (e.g., not to be exceeded threshold value). Further, negative power of ISG 240 may be limited (e.g., constrained to less than a threshold negative threshold power) based on operating conditions of electric energy storage device 262, by vehicle system controller 255, or electric machine controller 252. Any portion of desired negative wheel power that may not be provided by ISG 240 because of transmission or ISG limits may be allocated to engine 10 and/or friction brakes 218 so that the desired wheel power is provided by a combination of negative power (e.g., power absorbed) via friction brakes 218, engine 10, and ISG 240.

Accordingly, power control of the various powertrain components may be supervised by vehicle system controller 255 with local power control for the engine 10, transmission 208, electric machine 240, and brakes 218 provided via engine controller 12, electric machine controller 252, transmission controller 254, and brake controller 250.

As one example, an engine power output may be controlled by adjusting a combination of spark timing, fuel pulse width, fuel pulse timing, and/or air charge, by controlling throttle opening and/or valve timing, valve lift and boost for turbo- or super-charged engines. In the case of a diesel engine, controller 12 may control the engine power output by controlling a combination of fuel pulse width, fuel pulse timing, and air charge. Engine braking power or negative engine power may be provided by rotating the engine with the engine generating power that is insufficient to rotate the engine. Thus, the engine may generate a braking power via operating at a low power while combusting fuel, with one or more cylinders deactivated (e.g., not combusting fuel), or with all cylinders deactivated and while rotating the engine. The amount of engine braking power may be adjusted via adjusting engine valve timing. Engine valve timing may be adjusted to increase or decrease engine compression work. Further, engine valve timing may be adjusted to increase or decrease engine expansion work. In all cases, engine control may be performed on a cylinder-by-cylinder basis to control the engine power output.

Electric machine controller 252 may control power output and electrical energy production from ISG 240 by adjusting current flowing to and from field and/or armature windings of ISG as is known in the art.

Transmission controller 254 receives transmission input shaft position via position sensor 271. Transmission controller 254 may convert transmission input shaft position into input shaft speed via differentiating a signal from position sensor 271 or counting a number of known angular distance pulses over a predetermined time interval. Transmission controller 254 may receive transmission output shaft torque from torque sensor 272. Alternatively, sensor 272 may be a position sensor or torque and position sensors. If sensor 272 is a position sensor, controller 254 may count shaft position pulses over a predetermined time interval to determine transmission output shaft velocity. Transmission controller 254 may also differentiate transmission output shaft velocity to determine transmission output shaft rate of speed change. Transmission controller 254, engine controller 12, and vehicle system controller 255, may also receive addition transmission information from sensors 277, which may include but are not limited to pump output line pressure sensors, transmission hydraulic pressure sensors (e.g., gear clutch fluid pressure sensors), ISG temperature sensors, and BISG temperatures, gear shift lever sensors, and ambient temperature sensors. Transmission controller 254 may also receive requested gear input from gear shift selector 290 (e.g., a human/machine interface device). Gear shift selector 290 may include positions for gears 1-N (where N is an upper gear number), D (drive), and P (park).

Brake controller 250 receives wheel speed information via wheel speed sensor 221 and braking requests from vehicle system controller 255. Brake controller 250 may also receive brake pedal position information from brake pedal sensor 154 shown in FIG. 1 directly or over CAN 299. Brake controller 250 may provide braking responsive to a wheel power command from vehicle system controller 255. Brake controller 250 may also provide anti-lock and vehicle stability braking to improve vehicle braking and stability. As such, brake controller 250 may provide a wheel power limit (e.g., a threshold negative wheel power not to be exceeded) to the vehicle system controller 255 so that negative ISG power does not cause the wheel power limit to be exceeded. For example, if controller 250 issues a negative wheel power limit of 50 N-m, ISG power is adjusted to provide less than 50 N-m (e.g., 49 N-m) of negative power at the wheels, including accounting for transmission gearing.

Referring now to FIG. 3, a block diagram 300 of an example vehicle limiting system that includes a vehicle function limiting service is shown. In this example, the vehicle limiting service is included in an engine or powertrain control module, but alternative locations for the vehicle limiting service are possible. An example alternative location for the vehicle limiting service may be in a CAN gateway as indicated. In still other examples, the vehicle limiting service may be included in the vehicle system controller 255 or in another controller. Thus, it should be appreciated that the configurations shown herein are exemplary in nature and should not be considered as limiting. In this example, one vehicle feature 302 is shown for simplicity, but it should be appreciated that a plurality of vehicle features may interface with vehicle limiting service 306.

Vehicle feature 302 may be a combination of hardware and software, or hardware alone. Vehicle feature 302 may be a stolen vehicle services feature, a fleet vehicle services feature, an emergency services feature, an alcohol inhibit feature, an electric steering feature, a vehicle braking feature, an electric power distribution feature, a vehicle emissions system feature, an infotainment system feature, a vehicle lighting control feature, a powertrain control feature, or other feature. Vehicle feature 320 may communicate to vehicle function limiting service 306 via CAN 299. A gateway 298 may be included in CAN 299, and the gateway 298 may include the vehicle function limiting service 306 in some example configurations. The vehicle function limiting service may include all of the components and software modules described herein whether the vehicle function limiting service 306 is included in gateway 298, controller 12 (e.g., powertrain controller), or other system or controller.

In one example, controller 12 includes CAN driver circuitry 304 that communicates CAN messages between feature 302 and vehicle function limiting service 306. The vehicle function limiting service may include a state machine 306a. The state machine 306a receives requested vehicle behaviors from feature 302 as well as other features (not shown). The state machine 306a arbitrates to determine which of the received requested vehicle behaviors is to be implemented or applied. In addition, the state machine may resolve conflicts between requested vehicle behaviors. For example, if a powertrain feature is requesting a maximum powertrain output torque of 200 Newton-meters (Nm), but the stolen vehicle service feature is requesting an engine shutdown, state machine 306a may assign a higher priority to the stolen vehicle service feature request for the engine shutdown and cause the engine to be shutdown (e.g., stop rotating and combusting fuel). State machine 306a transfers vehicle behavior requests to one or more of logic modules 306b-306e.

The requested vehicle behaviors and the configuration of the present vehicle may be matched by the one or more logic modules 306b-306e. The configuration (e.g., describes the actuators, systems, and components of the vehicle) of the present vehicle when matched with the requested vehicle behaviors by the one or more logic modules 306b-306e defines and indicates which vehicle actuators are to be adjusted to provide the requested vehicle behavior. The one or more logic modules 306b-306e communicates with hardware and/or software modules 308 that control operation of the various vehicle actuators 320 (e.g., switches, solenoids, relays, inverters, fuel injectors, ignition coils, etc.). The software and/or hardware modules 308 may also receive status (e.g., position, operating state, etc.) of the various vehicle actuators from the vehicle actuators 320. The status of the vehicle actuators 320 may allow the software and hardware modules 308 to provide an indication of the status of the requested vehicle behavior to the logic modules 306b-306e. The logic modules may in turn provide vehicle behavior status information to state machine 306a. State machine 306a may pass the vehicle behavior status on to the various vehicle features.

Vehicle function limiting service 306 may include a micro-controller 306f, random-access memory 306g, and read-only memory 306h. The micro-controller 306f may include executable instructions stored in non-transitory memory to implement state machine 306a and logic modules 306b-306e. The actual total number of logic modules 306b-306e for a particular vehicle configuration may be a function of the actual total number of vehicle behaviors that may be intended to limit vehicle operation.

Supervisory module 310 may provide a level of redundancy for the vehicle function limiting service 306. In particular, supervisory module 310 may compare the inputs and outputs of function limiting service 306 to the inputs and outputs of logic and strategies that reside in supervisory module 310. If there is a difference between the inputs and outputs of supervisory module 310 and the inputs and outputs of the function limiting service 306, supervisory module 310 may provide an indication of the difference to the vehicle system controller 255 or other controllers in order to resolve the difference and/or mitigate issues that may result from the difference.

Thus, the system of FIGS. 1-3 provides for a vehicle system, comprising: a plurality of vehicle feature modules; a plurality of actuators; and a module including a vehicle function limiting service, the vehicle function limiting service including a state machine and a plurality of vehicle behavior limiting logic modules. The system further comprises a controller area network coupled to the plurality of feature modules and the module that includes the vehicle function limiting service. The system includes where the module that includes the vehicle function limiting service is positioned between the plurality of vehicle feature modules and the plurality of actuators. The system includes where the plurality of vehicle feature modules include a powertrain feature module. The system includes where the plurality of vehicle feature modules include an infotainment feature module. The system includes where the plurality of vehicle feature modules include a climate control module. The system includes where the module including the vehicle function limiting service includes executable instructions stored in non-transitory memory to perform the function limiting service. The system includes where the module including the vehicle function limiting service includes executable instructions stored in non-transitory memory to provide a response to a feature module included in the plurality of vehicle feature modules.

Figure 4:
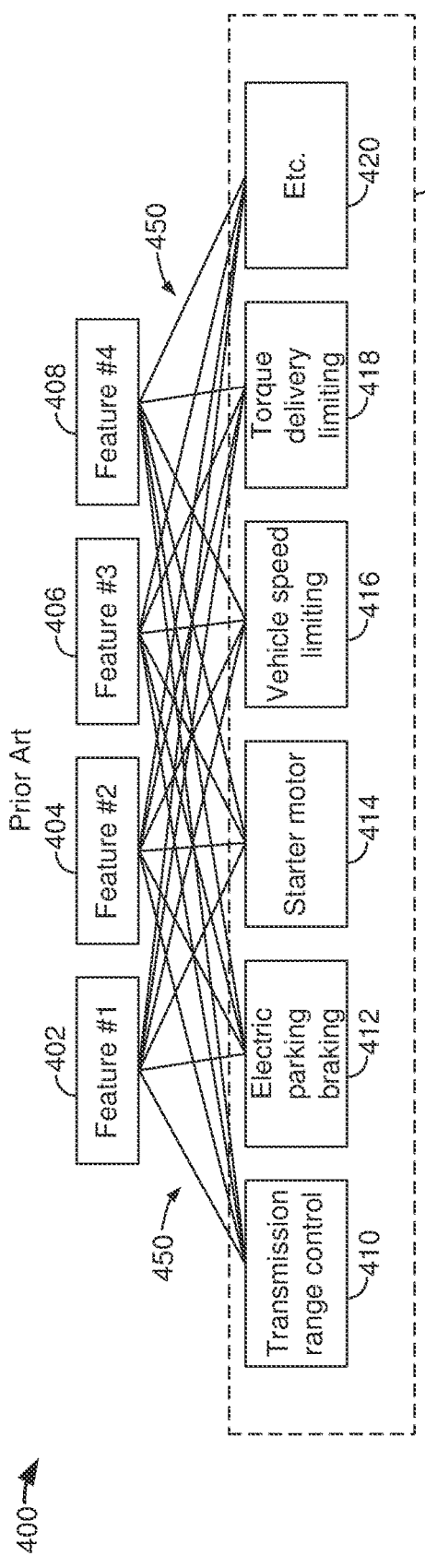
FIGS. 4 and 5 show block diagrams that show how vehicle features may interface with actuators of a vehicle.

Turning now to FIG. 4, a block diagram of a prior art way of interfacing vehicle features to vehicle actuators is shown. In this example, four features 402-408 are shown interfacing with actuator drivers 410-420. Lines 450 indicate channels of data or signal communication between features 402-408 and actuator drivers 410-420. The actuator drivers may be included in controller 12 and the features may be inside or external to controller 12. The data or signals may be bidirectional or unidirectional. In this example, each feature is shown having a line of communication with each actuator set 410-420. However, each feature need not communicate with each actuator driver. The actuator drivers may command and/or provide power and control signals to the various actuators described herein.

Thus, for a maximum complexity system, there may be a line of communication between each vehicle feature and each actuator driver. The lines of communication may have specific requirements (e.g., type of data that may be exchanged, data format, verification protocols, etc.) for exchanging data and information between each feature and each actuator driver. As such, designers of such a system may expend considerable effort to ensure that communication between the various features and the actuator drivers is reliable and understood. Further, each time that a new feature is added to the system, revisions to the actuator drivers may be required. Thus, such a vehicle limiting system may require significant resources to implement.

Figure 5:
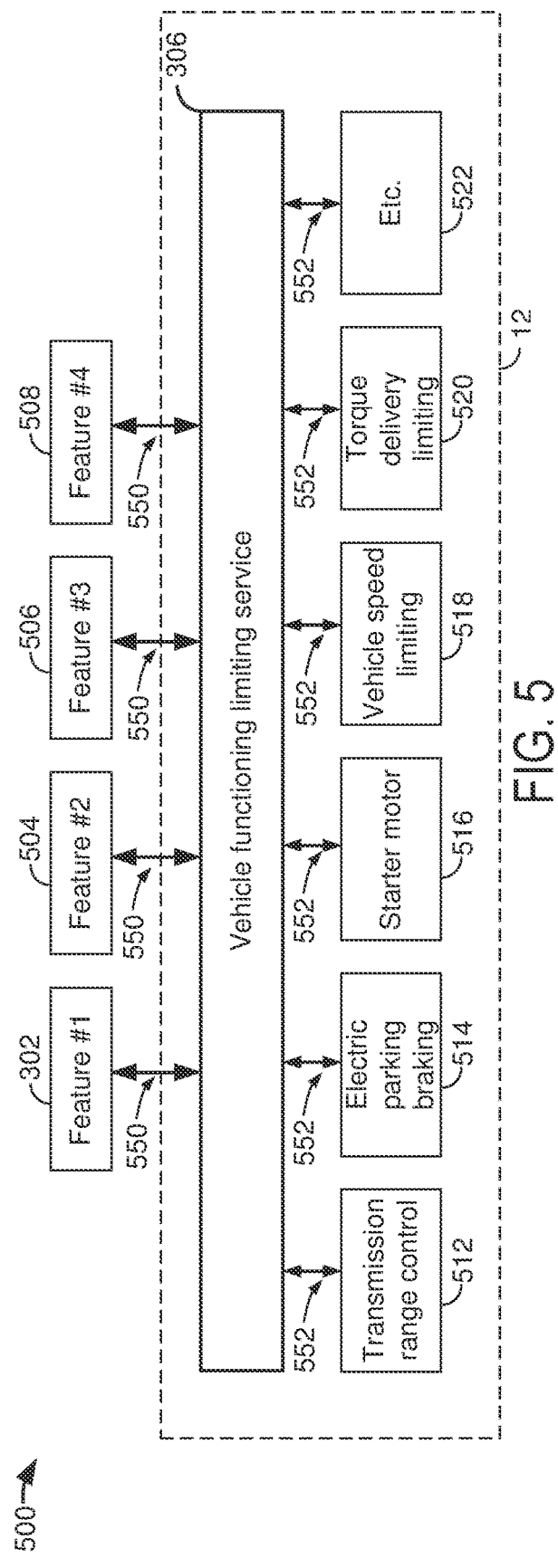

Referring now to FIG. 5, a block diagram of a way of interfacing vehicle features to vehicle actuators according to the present description is shown. In this example, four features 302, 504, 506, and 508 are shown interfacing with actuator drivers 512-522. Lines 550 indicate CAN bus linkage between features 302, 504, 506, and 508 and the vehicle function limiting service 306. Lines 552 indicate channels of data or signal communication (e.g., controller inputs and/or outputs) between features 302, 504, 506, and 508 and actuator drivers 512-522. The actuator drivers may be included in controller 12 and the features may be inside or external to controller 12. The CAN bus and the controller inputs and/or outputs may be bidirectional or unidirectional. In this example, each feature is shown having only a single CAN link of communication with the vehicle function limiting service 306. In addition, the vehicle function limiting service 306 includes only a single line of communication with each of the actuator drivers 512-522, but in other examples, additional lines of communication may be provided. The vehicle function limiting service decides which of the vehicle features 302, 504, 506, and 508 may adjust operation of the vehicle's actuators via the vehicle's actuator drivers. The actuator drivers may be a combination of hardware and software, or alternatively, only hardware.

Thus, for a maximum complexity system, there may be only a single line of communication or communication link (e.g., CAN bus) between each vehicle feature and the vehicle function limiting service. In addition, there may be only a single line or communication or communication link (e.g., dedicated controller inputs and outputs) between the vehicle function limiting service 306 and each of the actuator drivers. The lines of communication may have specific requirements (e.g., type of data that may be exchanged, data format, verification protocols, etc.) for exchanging data and information between each feature and each actuator driver. As such, designers of such a system may expend much less effort to ensure that communication between the various features and the actuator drivers is reliable and understood. This may be because a standard for data exchange between features and the vehicle function limiting service may be implemented. Further, a standard for data exchange between the vehicle function limiting service and individual actuator drivers may be implemented. As such, the interface between the various components may be defined such that it need not be modified and/or redesigned each time a new feature is added to the vehicle limiting system. As such, a vehicle limiting system of the present type may require fewer resources to implement.

Referring now to FIG. 6, a block diagram 600 of CAN message exchanges between vehicle features and a vehicle function limiting service is shown. The vehicle features are shown at 302, 504, and 506. The vehicle features may be comprised of hardware and software as previously mentioned. The vehicle features may send and receive CAN messages to request predetermined vehicle behaviors to limit vehicle operation. Arrow 602 represents a CAN message sent from vehicle feature 302 to vehicle function limiting service 306. Arrow 620 represents a CAN message sent from vehicle feature 504 to vehicle function limiting service 306. Arrow 640 represents a CAN message sent from vehicle feature 506 to vehicle function limiting service 306. Arrow 610 represents a CAN message sent from vehicle function limiting service 306 to vehicle feature 302. Arrow 630 represents a CAN message send from vehicle function limiting service 306 to vehicle feature 504. Arrow 650 represents a CAN message sent from vehicle function limiting service 306 to vehicle feature 506.

In this example, CAN message 602, which is sent between feature 302 and vehicle function limitation service 306, includes a first CAN signal 604 that represents a request group A behavior that is comprised of five bits. CAN message 602 also includes a second CAN signal 606 that represents a request group B behavior that is comprised of five bits. CAN message 602 also includes a third CAN signal 608 that represents a request to activate the requested vehicle behavior that is comprised of two bits. CAN message 602 may include additional signals that may have additional bits based on the configuration of the feature.

CAN message 610, which is sent between vehicle function limitation service 306 and feature 302, includes a first CAN signal 612 that represents a response to a group A behavior request that is comprised of five bits. CAN message 610 also includes a second CAN signal 614 that represents a response to a group B behavior request that is comprised of five bits. CAN message 610 also includes a third CAN signal 616 that represents a response status for group A requests that is comprised of three bits. CAN message 610 includes an additional signal 618 that represents a response status for group B requests that is comprised of three bits. CAN message 620 includes signals 622-626 that are similar to signals 604-608 of CAN message 602. CAN message 620 also includes signals 632-638 that are similar to signals 612-618 of CAN message 602.

CAN message 640 includes all of the signals that CAN messages 602 and 620 include. However, CAN message 650, which is sent between vehicle function limitation service 306 and feature 506, includes additional signals. In particular, CAN message 650 includes a first CAN signal 652 that represents a response to a group A behavior request that is comprised of five bits. CAN message 650 also includes a second CAN signal 654 that represents a response to a group B behavior request that is comprised of five bits. CAN message 650 also includes a third CAN signal 656 that represents a response status for group A requests that is comprised of three bits. CAN message 650 also includes an additional signal 658 that represents a response status for group B requests that is comprised of three bits. Finally, CAN message 650 includes a fifth signal that includes twelve bits for check sum verification and other features, if desired.

The CAN message signals described in FIG. 6 are merely examples and they should not be construed as limiting. For example, the signals previously mentioned may include additional or fewer bits depending on the vehicle features.

Referring now to FIG. 7, two groups of example vehicle behavior requests are shown. The first group of example vehicle behaviors is shown in table 700. The second group of example vehicle behaviors is shown in table 720. Table 700 and table 720 list states that identify the requested vehicle behaviors, the type of inhibit behavior, and a description of the behavior. The states of table 700 are indicated in column 702. The type of inhibit behaviors are indicated on column 704. Note that the behaviors are not actuator requests. Rather, the behaviors describe how the vehicle responds or operates to a request. Further, to provide the recited behavior, more than one actuator may be adjusted. The descriptions of the behaviors are indicated in column 702. The rows define the state, the type of inhibit behavior corresponding to the state, and the description of the inhibited behavior for the corresponding state. For example, the first row of states 710 of table 700 indicates that a state value of one requests that no vehicle limitations are presently being requested. Since no limits are requested under state number one, the vehicle may operate at its maximum capacities. Conversely, the eighth row of states 712 of table 700 indicates that a state value of eight requests a low level vehicle speed limit (VSL). The low level vehicle speed limit may be a predetermined value (e.g., 10 kilometers/hour). In this example, there are twenty nine rows of states in table 700, but the actual total number of states may be greater or less than twenty nine. The twenty ninth row state is reserved for a future vehicle behavior.

The second group of example vehicle behaviors is shown in table 720. The vehicle behaviors shown in the second group are identical to those that are shown in the first group. The second group of behavior requests allows a single vehicle feature to make more than one behavior request at a same time. This allows a vehicle feature to limit vehicle operation in two ways at a same time. In addition, by allowing for two or more groups of vehicle behaviors, smoother transitions between limiting modes may be provided. In this example, the first and second groups of vehicle behavior requests include requests for inhibiting a powertrain from operating, a secure mode request that seeks to prevent vehicle movement, a non-motive mode request that seeks to prevent powertrain power transmission, a limiting propulsion mode, vehicle speed limit requests, powertrain torque limit requests, electric vehicle (EV) only mode request, internal combustion engine only mode (save EV) request, forward propulsion only mode request, and reverse propulsion only mode request.

Each vehicle feature may select and request predetermined vehicle behaviors from the first and second groups of behaviors, which are same groups of vehicle behaviors. In other words, each vehicle feature may request one or more vehicle behaviors from only equivalent groups of vehicle behaviors that are a basis for vehicle behaviors that are requested by other vehicle features. For example, a stolen vehicle service feature may request a behavior from a first group of vehicle behaviors, and the stolen vehicle service feature may request a behavior from the second group of vehicle behaviors. Likewise, a fleet vehicle service feature may request a behavior from the same first group of vehicle behaviors, and the fleet vehicle service feature may request a second behavior from the same second group of vehicle behaviors. Thus, each vehicle feature may only select and request vehicle behaviors from same groups of vehicle behaviors that may be requested by other vehicle features. In this way, the vehicle may respond to a limited group of vehicle behaviors that are common for all vehicle features that request vehicle behaviors.

Referring now to FIG. 8, two groups of example vehicle function limiting (VFL) feature responses are shown. The first group of example vehicle function limiting feature responses is shown in table 800. The second group of example vehicle function limiting feature responses is shown in table 820. Table 800 and table 820 list states that identify the vehicle function limiting feature responses, the type of inhibit behavior, and a description of the behavior. The states of table 800 are indicated in column 802. The type of inhibit behaviors are indicated on column 804. The descriptions of the behaviors are indicated in column 802. The rows define the state, the type of inhibit behavior corresponding to the state, and the description of the inhibited behavior for the corresponding state. For example, the first row of states 810 of table 800 indicates that a state value of one responds to indicate that no vehicle limitations are presently being requested. Conversely, the eighth row of states 812 of table 800 indicates that a response to a state value of eight may be provided. In this example, there are twenty nine rows of response states in table 800, but the actual total number of states may be greater or less than twenty nine. The twenty ninth row state is reserved for a future vehicle response.

The second group of example vehicle function limiting feature responses is shown in table 820. The vehicle function limiting feature responses shown in the second group are identical to those that are shown in the first group of responses. In this example, the first and second groups of vehicle function limiting feature responses include responses to requests for inhibiting a powertrain from operating, a secure mode that seeks to prevent vehicle movement, a non-motive mode that seeks to prevent powertrain power transmission, a limiting propulsion mode, vehicle speed limits, powertrain torque limits, electric vehicle (EV) only mode, internal combustion engine only mode (save EV), forward propulsion only mode, and reverse propulsion only mode.

Each vehicle feature may select and respond to the first and second groups of responses, which are same groups of vehicle responses. In other words, each vehicle feature may respond to one or more vehicle behaviors from only same groups of vehicle responses that are a basis for vehicle responses that may be provided by other vehicle features. Thus, the vehicle function limiting service may only select and respond to vehicle features according to a same groups of vehicle responses. In this way, the vehicle may provide responses to a limited group of vehicle behaviors that are common for all vehicle features that request vehicle behaviors.

Referring now to FIG. 9, a flowchart of a method for limiting vehicle operation is shown. The method of FIG. 9 may be incorporated into and may cooperate with the system of FIGS. 1-3. Further, at least portions of the method of FIG. 9 may be incorporated as executable instructions stored in non-transitory memory while other portions of the method may be performed via a controller transforming operating states of devices and actuators in the physical world. At least portions of method 900 may be performed by vehicle features, while other portions of method 900 may be performed via a controller that includes a vehicle function limiting service. Each vehicle feature may perform one or more steps of method 900.

At 902, method 900 determines vehicle operating conditions. Vehicle operating conditions may be determined from the sensors and actuators included with the vehicle. The vehicle operating conditions may include, but are not limited to engine speed, vehicle speed, driver demand torque, ambient air temperature, barometric pressure, torque converter impeller speed, vehicle drive mode, etc. Method 900 proceeds to 904.

At 904, method 900 requests vehicle behaviors and the requested vehicle behaviors may limit vehicle operation. The requested vehicle behaviors may be based on or included in two groups of predetermined vehicle behaviors that limit vehicle operation. The limiting may include reducing capacity of the vehicle from a maximum capacity, or alternatively, the limiting may include limiting which vehicle modes are available or which states of a system are available. For example, the limiting may include limiting powertrain torque to 200 Newton-meters when the maximum powertrain torque capacity is 400 Newton-meters. Further, the limiting may include allowing a transmission to engage only park (P), neutral (N), and drive (D) modes. Further still, the limiting may include limiting a vehicle operating mode to normal or economy while preventing the vehicle from operating in a performance mode. The vehicle features may provide the requested vehicle behaviors and the vehicle features may be external to a module (e.g., hardware or software) that includes the vehicle function limiting service. In one example, the requested vehicle behaviors may be of the type shown in FIG. 8. Method 900 proceeds to 906 after requests for vehicle behaviors have been determined.

At 906, method 900 communicates the requested vehicle behaviors to the vehicle function limiting service. The vehicle functioning limiting service may be included in a CAN gateway or in another controller (e.g., a powertrain or engine controller). In one example, method 900 may communicate the requested vehicle behaviors via a CAN as described in FIGS. 5 and 6. In particular, vehicle features may communicate their vehicle behaviors in the form of CAN messages to the vehicle function limiting service. Method 900 proceeds to 908.

At 908, method 900 evaluates the requested vehicle behaviors, prioritizes the requested vehicle behaviors, and resolves conflicts in requested vehicle behaviors. Each vehicle feature may request two or more vehicle behaviors. The plurality of requested vehicle behaviors may be assigned priorities according to predetermined priorities included in the vehicle function limiting service. For example, a requested vehicle behavior that is a powertrain inhibit request may have a higher priority than a requested vehicle behavior that limits powertrain torque. The higher priority requested vehicle behavior may be requested and implemented via vehicle actuators before and/or in place of a lower priority requested vehicle behavior. In addition, if a first vehicle feature is requesting a vehicle behavior comprising a low vehicle speed limit and a second vehicle feature is requesting a vehicle behavior comprising a medium vehicle speed limit, the vehicle feature limiting service may resolve this conflict by selecting and implementing the lower vehicle speed limit. Method 900 proceeds to 910 after vehicle limiting service evaluates and arbitrates the plurality of vehicle behaviors.

At 910, method 900 requests vehicle actuators to operate in a way that generates the requested vehicle behaviors. In particular, the vehicle limiting service may issue commands to one or more actuators to generate the requested vehicle behaviors. For example, if the requested vehicle behavior is inhibiting powertrain operation, method 900 may request that fuel injectors cease injecting fuel and that inverters cease delivering power to electric propulsion devices. Thus, operation of one or more actuators may be adjusted to provide the requested vehicle behavior. The vehicle function limiting service may interface with the actuators as described herein. Method 900 proceeds to 912.

At 912, the vehicle's actuators receive requests to change position or operating state and the actuators communicate their status back to the vehicle function limiting service. For example, if the actuator is a fuel injector, an fuel injector driver circuit may provide an indication that the fuel injector is closed and not injecting fuel. Method 900 proceeds to 914.

At 914, method 900 communicates the status of whether or not the requested vehicle behavior is complete, in progress, or not implemented to the vehicle features that have requested vehicle behaviors. The communication may be from the vehicle limiting service to the vehicle features via a CAN network as described herein. Method 900 proceeds to exit.

In this way, a plurality of vehicle features may select individual vehicle behaviors from a common group of vehicle behaviors. The vehicle features may communicate requested vehicle behaviors to a vehicle function limiting service and the vehicle function limiting service may command vehicle one or more actuators, or issue requests to the vehicle actuators, to adjust their position or state in a way that provides a requested vehicle behavior. This allows a plurality of vehicle features to communicate with a single vehicle feature limiting service and the single vehicle feature limiting service may command or request actuators to provide a requested vehicle behavior. Thus, the method of FIG. 9 provides for a method for limiting operation of a vehicle, comprising: receiving a plurality of requests from a plurality of vehicle features to a vehicle function limiting service, where the plurality of requests are based on a single group of predefined vehicle behaviors; and adjusting one or more actuators according to output of the vehicle function limiting service. The method includes where the single group of predefined vehicle behaviors includes powertrain torque limits. The method includes where the single group of predefined vehicle behaviors includes vehicle speed limits. The method includes where the single group of predefined vehicle behaviors includes vehicle security limits. The method includes where the single group of predefined vehicle behaviors include powertrain mode limits. The method includes where the vehicle function limiting service is included in a CAN bus gateway. The method includes where the vehicle function limiting service is included in a powertrain control module.

The method of FIG. 8 also provides for a method for limiting operation of a vehicle, comprising: arbitrating priority levels for a plurality of vehicle limit requests and adjusting operation of one or more actuators based on the arbitrated priority levels for the plurality of vehicle limit requests. The method includes where each of the plurality of vehicle limit requests is based on a predetermined group of vehicle behaviors. The method includes where adjusting operation of one or more actuators includes adjusting operation of an actuator according to logic that adjusts operation of the actuator based on a vehicle behavior and a vehicle configuration. The method further comprises communicating the vehicle limit requests from one or more vehicle features to a vehicle function limiting service. The method includes where the vehicle function limiting service provides the arbitrating.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, at least a portion of the described actions, operations and/or functions may graphically represent code to be programmed into non-transitory memory of the computer readable storage medium in the control system. The control actions may also transform the operating state of one or more sensors or actuators in the physical world when the described actions are carried out by executing the instructions in a system including the various engine hardware components in combination with one or more controllers.

This concludes the description. The reading of it by those skilled in the art would bring to mind many alterations and modifications without departing from the spirit and the scope of the description. For example, single cylinder, I3, I4, I5, V6, V8, V10, and V12 engines operating in natural gas, gasoline, diesel, or alternative fuel configurations could use the present description to advantage.

The invention claimed is:

1. A method for limiting operation of a vehicle, comprising:
receiving a plurality of vehicle behavior requests from each of a plurality of vehicle features to a state machine of a vehicle function limiting service, where each of the plurality of vehicle features selects vehicle behavior requests from two groups of predefined vehicle behaviors, where the two groups of predefined vehicle behaviors is comprised of vehicle behaviors that are not actuator requests, and where the vehicle behaviors describe how a vehicle responds;
resolving conflicts between the plurality of vehicle behavior requests and assigning priority levels to the plurality of vehicle behavior requests via the state machine;
matching the plurality of vehicle behavior requests to a vehicle configuration via a plurality of logic modules to indicate which of one or more actuators provide the plurality of vehicle behavior requests; and
adjusting the one or more actuators according to output of the vehicle function limiting service.

2. The method of claim 1, where the two groups of predefined vehicle behaviors includes powertrain torque limits.

3. The method of claim 2, where the two groups of predefined vehicle behaviors includes vehicle speed limits.

4. The method of claim 3, where the two groups of predefined vehicle behaviors includes vehicle security limits.

5. The method of claim 4, where the two groups of predefined vehicle behaviors includes powertrain mode limits.

6. The method of claim 1, where the vehicle function limiting service is included in a CAN bus gateway.

7. The method of claim 1, where the vehicle function limiting service is included in a powertrain control module and further comprising:
comparing inputs and outputs of the vehicle function limiting service to inputs and outputs of a supervisory module, and providing an indication in response to a difference between the inputs and outputs of the vehicle function limiting service and the inputs and outputs of the supervisory module.

8. A vehicle system, comprising:
a plurality of vehicle feature modules;
a plurality of actuators; and
a module including a vehicle function limiting service, the vehicle function limiting service including a state machine and a plurality of vehicle behavior limiting logic modules, where the state machine resolves conflicts between requested vehicle behaviors from the plurality of vehicle feature modules and assigns priorities to vehicle feature requests, and where the requested vehicle behaviors are not actuator requests.

9. The system of claim 8, further comprising a controller area network coupled to the plurality of feature modules and the module that includes the vehicle function limiting service.

10. The system of claim 8, where the module that includes the vehicle function limiting service is positioned between the plurality of vehicle feature modules and the plurality of actuators.

11. The system of claim 8, where the plurality of vehicle feature modules include a powertrain feature module.

12. The system of claim 11, where the plurality of vehicle feature modules include an infotainment feature module.

13. The system of claim 12, where the plurality of vehicle feature modules includes a climate control module, and the system further comprising:
instructions stored in non-transitory memory of the module that includes the vehicle function limiting service that cause the module that includes the vehicle function limiting service to receive a plurality of vehicle behavior requests from each of a plurality of vehicle feature modules, where each of the plurality of vehicle features selects vehicle behavior requests from two groups of predefined vehicle behaviors, where the two groups of predefined vehicle behaviors is comprised of vehicle behaviors that are not actuator requests, and where the vehicle behaviors describe how a vehicle responds.

14. The system of claim 8, where the module that includes the vehicle function limiting service includes executable instructions stored in non-transitory memory to perform the vehicle function limiting service.

15. The system of claim 8, where the module that includes the vehicle function limiting service includes executable instructions stored in non-transitory memory to provide a response to a feature module included in the plurality of vehicle feature modules.

16. A method for limiting operation of a vehicle, comprising:
arbitrating priority levels for a plurality of vehicle behavior requests and adjusting operation of one or more actuators based on the arbitrated priority levels for the plurality of vehicle behavior requests, where each of a plurality vehicle features selects vehicle behavior requests from two groups of predefined vehicle behaviors, where the two groups of predefined vehicle behaviors is comprised of vehicle behaviors that are not actuator requests, and where the vehicle behaviors describe how a vehicle responds;
comparing inputs and outputs of a vehicle function limiting service to inputs and outputs of a supervisory module; and
providing an indication in response to a difference between the inputs and outputs of the vehicle function limiting service and the inputs and outputs of the supervisory module.

17. The method of claim 16, where each of the plurality of vehicle behavior requests is based on a predetermined group of vehicle behaviors.

18. The method of claim 16, where adjusting operation of one or more actuators includes adjusting operation of an actuator according to logic that adjusts operation of the actuator based on vehicle behavior and a vehicle configuration.

19. The method of claim 16, further comprising communicating the vehicle behavior requests from one or more vehicle features to a vehicle function limiting service.

20. The method of claim 19, where the vehicle function limiting service provides the arbitrating.

* * * * *